United States Patent [19]

Kingston

[11] Patent Number: 4,606,083
[45] Date of Patent: Aug. 19, 1986

[54] TUB COVER

[75] Inventor: James E. Kingston, Arlington, Wash.

[73] Assignee: Marlys A. Sliger, LaConner, Wash.

[21] Appl. No.: 591,303

[22] Filed: Mar. 19, 1984

[51] Int. Cl.⁴ .............................................. A47K 3/02
[52] U.S. Cl. ......................................... 4/580; 4/498; 4/499; 4/504; 220/215
[58] Field of Search .................... 4/498, 499, 580–583, 4/488, 494, 496, 500–504; 220/215, 216; 5/485, 586, 502, 334

[56] References Cited

U.S. PATENT DOCUMENTS

| | | | |
|---|---|---|---|
| 1,090,565 | 3/1914 | Port | 220/215 |
| 3,072,920 | 1/1963 | Yellott | 4/498 |
| 3,506,143 | 4/1970 | Evans | 206/522 |
| 3,533,110 | 10/1970 | Gisondi | 4/499 |
| 3,556,318 | 1/1971 | Hollis | 206/522 |
| 3,816,859 | 6/1974 | Mosehauer | 4/499 |
| 4,078,293 | 3/1978 | Aine | 4/498 |
| 4,137,575 | 2/1979 | Klaffke et al. | 4/498 |
| 4,222,192 | 12/1983 | Jacobs | 4/580 |
| 4,236,259 | 12/1980 | Wendt | 4/580 |
| 4,313,421 | 2/1982 | Trihey | 4/499 |

FOREIGN PATENT DOCUMENTS

| | | | |
|---|---|---|---|
| 1810372 | 6/1970 | Fed. Rep. of Germany | 5/334 |
| 2206296 | 8/1973 | Fed. Rep. of Germany | 4/498 |
| 2212413 | 9/1973 | Fed. Rep. of Germany | 4/498 |
| 2427815 | 1/1976 | Fed. Rep. of Germany | 4/499 |
| 2440458 | 3/1976 | Fed. Rep. of Germany | 4/499 |
| 500053 | 11/1954 | Italy | 5/502 |

*Primary Examiner*—Stephen Marcus
*Assistant Examiner*—Linda J. Sholl
*Attorney, Agent, or Firm*—Ward Brown; Robert W. Beach

[57] ABSTRACT

Thin, flexible sheets of water-impervious plastic material have their margins heat-sealed together and enclose a layer of insulating material of a size sufficient to cover the internal area of a tub. An internal bladder is of a size sufficient to cover at least the major portion of the water surface area of the tub, is supported on the intermediate sheet and itself is covered by a thicker, weather-resistant top sheet. The margins of all of the sheets are secured together and adapted to be secured to the curb or deck of the tub.

1 Claim, 3 Drawing Figures

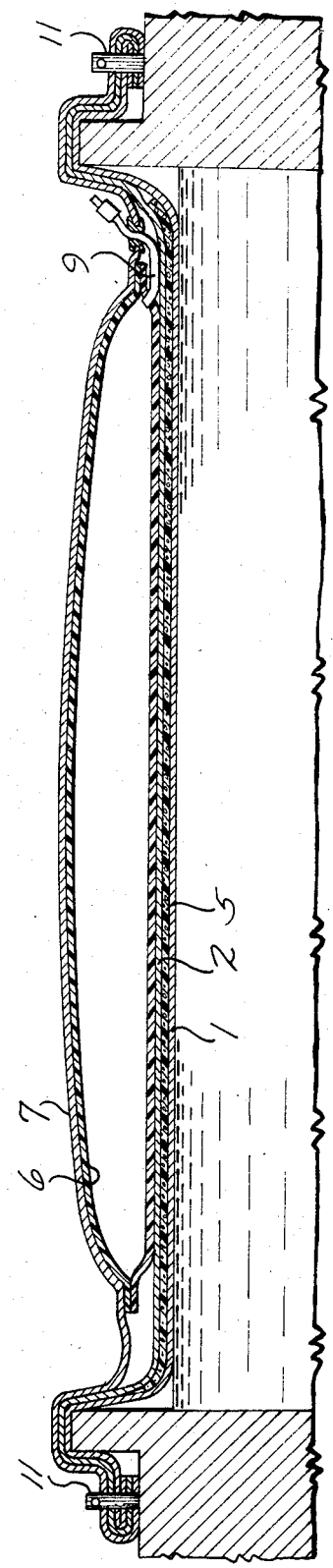

TUB COVER

BACKGROUND OF THE INVENTION

1. Field of the Invention

The present invention relates to an improved flexible cover for a hot tub or spa.

2. Prior Art

It is desirable to cap a hot tub or spa when not in use to keep the water clean and to maintain a desired water temperature with a minimum expenditure of energy.

Close-fitting, custom-made, rigid lids are known, and rigid lids have the additional advantage of protecting against people, particularly children, falling into the tub or spa. Unfortunately, such rigid lids are bulky, difficult to store, heavy and expensive.

Thin, flexible covers have been used and are lighter and easier to use and store and less expensive but, up to now, have not offered the durability and safety of rigid lids and have had only nominal insulating value.

SUMMARY OF THE INVENTION

The principal object of the present invention is to provide a light, flexible cover for a hot tub or spa having the insulating value, durability and safety of a close-fitting rigid lid but lighter, easier to install and store and less expensive than a rigid lid.

In the preferred embodiment of the present invention, such object is accomplished by providing a multilayer cover including thin, water-impervious, flexible bottom and intermediate sheets enclosing a thin but highly insulative layer of flexible insulating material. A large air bladder is interposed between the intermediate sheet and a thicker, weather-resistant, flexible top sheet of a size sufficient to completely cover the tub or spa with sufficient slack to drape loosely over the tub curb. The outer margin of the top sheet is adapted to be anchored to the curb or deck of the tub or spa. The cover is highly insulative and also is sufficiently buoyant so as to support a person who inadvertently falls onto it.

BRIEF DESCRIPTION OF THE DRAWINGS

FIG. 3 is a diametral section of the cover of FIGS. 1 and 2 installed over a tub or spa.

DETAILED DESCRIPTION

A tub cover in accordance with the present invention is intended to be used to cap a hot tub or spa when not in use and thereby prevent unwanted objects, such as leaves or twigs, from dirtying the tub water, in addition to providing a highly insulative layer allowing the water to be maintained at a desired temperature with a minimum expenditure of energy and protecting against people inadvertently falling into the tub.

Figure 1:
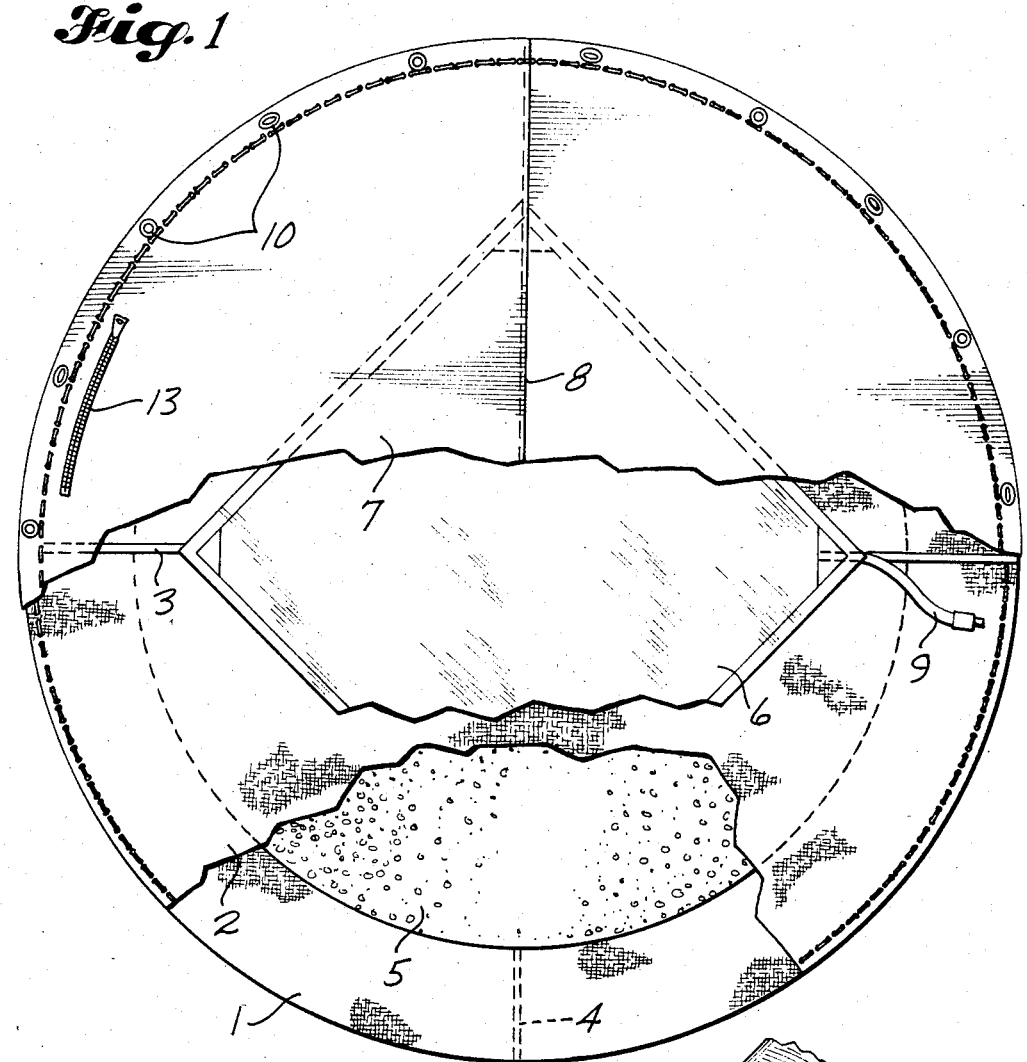
FIG. 1 is a top plan of a tub cover in accordance with the present invention with parts broken away.

As best seen in FIGS. 1 and 3, the preferred cover in accordance with the present invention includes several layers of flexible water-impervious sheet material. The bottom sheet 1 and an intermediate sheet 2 preferably are nylon-reinforced, vinyl material such as the "Bruin-tuff" brand material manufactured by Bruin Plastics of Glendale, R.I. The outer margins of such bottom and intermediate sheets are heat-sealed together to form a closed pocket between them. Internal seams 3 and 4, which extend diametrally of the circular cover in the illustrated embodiment, also are heat-sealed. Preferably the diametral seam 4 for the intermediate sheet 2 extends substantially perpendicular to the seam 3 for the bottom sheet 1 to increase the tensile strength of the heat-welded sheets.

A layer 5 of buoyant, flexible, insulating sheet material is interposed between the bottom sheet 1 and the intermediate sheet 2. The one-quarter inch thick "Sentinel" brand polyethylene closed-cell foam material manufactured by Packaging Industries of Viola, Calif., has been found to have a very high insulating value for its thickness. The insulating layer 5 should be of sufficient size to cover the entire or substantially the entire water surface area of the tub.

A large bladder 6 is supported on the intermediate sheet 2 and can be formed of top and bottom sheets of 20 mil unsupported polyvinyl chloride material with such sheets being heat-sealed together at their margins. As best seen in FIG. 1, preferably the bladder is of a size smaller than the flexible insulating layer 5, that is, smaller than the internal area of the tub, but sufficient to cover the major portion of the water surface area. The bottom sheet of the bladder is glued to the top of the intermediate sheet 2 to maintain the bladder in a central position.

Figure 2:
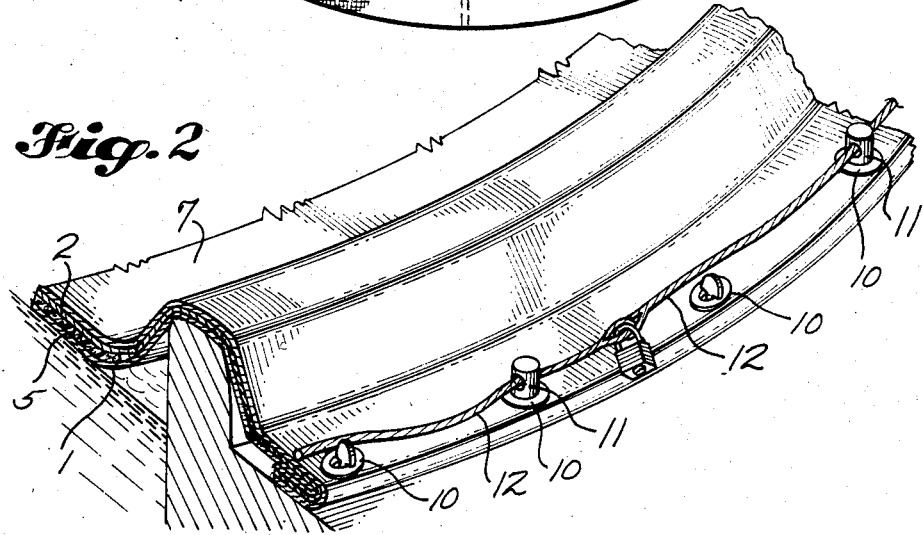
FIG. 2 is a fragmentary top perspective of a marginal portion of the cover of FIG. 1 showing such cover installed over a tub or spa.

The top sheet 7 of the bladder is heavier, weather-resistant sheet material such as the cotton-backed marine vinyl sold under the trademark "Marina" or "Seafarer" by Intex Plastics of Los Angeles, Calif. Preferably the margins of the bottom, intermediate and top sheets are folded under, as shown in FIGS. 2 and 3, and then the entire six layer margin is sewn. The internal diametral seam 8 of the top sheet also is sewn, but preferably also is sealed against water leakage by a suitable adhesive composition such as a silicone sealant.

The inflation hose 9 for the internal bladder extends through the top sheet 7 as shown in FIG. 3. For securing the cover in place over a tub or spa, circumferentially spaced grommets 10 are provided in the outer margin of the cover for receiving conventional fasteners mounted on the tub curb or deck such as shown in FIG. 2. For security and safety, preferably the tub lip or deck has eye bolts 11 for projecting upward through at least some of the grommets, and a cable 12 is threaded through the eyes and has its ends locked together, as also shown in FIG. 2.

It is important, of course, that all internal seams be waterproof as described above, but the outer circumferential seam can be sewn because it is not exposed to the water. Nevertheless, as shown in FIG. 1, a zipper 13 can be provided in the top sheet 7 allowing access to the interior of the cover so that any water that leaks into the cover can be drained. The zipper also allows additional insulation material to be inserted if desired by the purchaser.

With the cover in position as shown in FIG. 3, the tub is protected against heat loss by the insulating layer 5. Such insulating layer is buoyant enough to float the cover on the surface of the tube water before the bladder is inflated. Additional insulation is provided by inflating the bladder 6 after the cover has been installed on the tub. As seen in FIG. 3, even with the bladder inflated substantially its entire lower sheet surface contiguously contacts the intermediate sheet 2, and the margins of the top, bottom and intermediate sheets drape loosely over the tub curb so that the underside of the bottom sheet 1 contiguously lies on substantially the entire surface area of the water in the tub regardless of minor changes in the level of the water. Also, the bladder covers at least the major portion of the water surface area and makes the cover sufficiently buoyant to support a person who jumps or falls onto the cover without appreciable supporting force being supplied by the marginal portion of the sheets draped over the tub curb.

I claim:

1. A buoyant flexible cover for a water tub having a curb above the surface of the water in the tub, said cover comprising a multiplicity of flexible sheets of water-impervious material including a bottom sheet, an intermediate sheet and a top sheet, said sheets having their margins secured together for forming two closed pockets between, respectively, said bottom sheet and said intermediate sheet and said intermediate sheet and said top sheet, said secured margins of said sheets being adapted to be anchored outside the tub curb with sufficient marginal slack of all three of said sheets to drape over the tub curb and extend loosely downward closely adjacent to the inner wall of the tub curb so that the underside of said bottom sheet contiguously lies on substantially the entire surface area of the water in the tub despite minor changes in the level of the water, an inflatable bladder having upper and lower sheet surfaces separate from said top and intermediate sheets, of a size smaller than the internal area of the tub but covering at least the major portion of the internal area of the tub and received in the pocket between said intermediate sheet and said top sheet, substantially the entire lower sheet surface of said bladder when inflated being flat and substantially contiguously contacting said intermediate sheet, and a layer of flexible, buoyant, heat-insulating sheet material received in the pocket between said bottom sheet and said intermediate sheet, of a size sufficient to cover substantially the entire internal area of the tub and sufficiently buoyant to floatingly support said sheets and said bladder without any appreciable supporting force being supplied by the marginal portions of said three sheets draped over the tub curb, said bladder being inflatable for providing sufficient buoyancy to support the weight of a person on the cover without appreciable supporting force being supplied by the marginal portion of said three sheets draped over the tub curb.

* * * * *